United States Patent Office 3,229,937
Patented Jan. 18, 1966

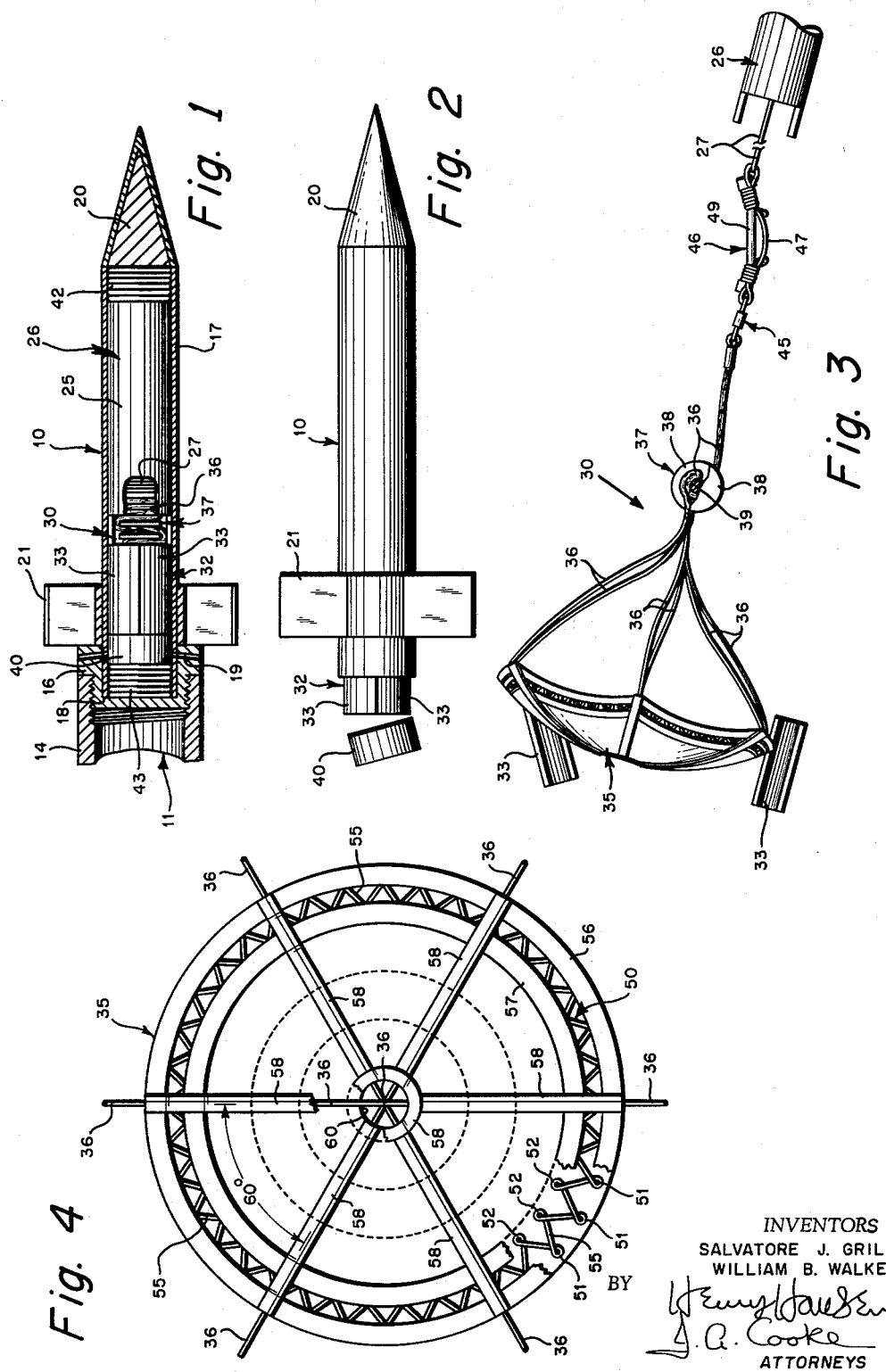

---

3,229,937
SELF-OPENING NONPOROUS PARACHUTE
Salvatore J. Grillo, Willow Grove, and William B. Walker, Hatboro, Pa., assignors to the United States of America as represented by the Secretary of the Navy
Filed Mar. 24, 1964, Ser. No. 354,486
5 Claims. (Cl. 244—149)
(Granted under Title 35, U.S. Code (1952), sec. 266)

The invention described herein may be manufactured and used by or for the Government of the United States of America for governmental purposes without the payment of any royalties thereon or therefor.

The present invention relates to a parachute device and more particularly to a parachute of the positive-opening type.

Radiosondes of the type characterized in the present invention are generally used for measuring various atmospheric conditions and for transmitting the data so measured. They may be carried upward by balloons, or may be dropped from aircraft and retarded in descent by a parachute or the like. Both of these methods precluded investigation of large areas over a short period of time. For instance, the balloon radiosonde is inherently slow-rising and its path of ascent cannot be accurately predicted. On the other hand, radiosondes dropped from aircraft are obviously limited to investigations below the maximum altitude at which the aircraft can be safely operated.

A more recent innovation is the rocket-propelled radiosonde, hereinafter referred to as a rocketsonde, which permits rapid investigations at extremely high altitudes. Such rocketsondes are launched from an aircraft thereby extending the investigating capabilities of radiosonde equipment contained therein to an altitude beyond the range of the rocketsonde itself. The method and apparatus for launching the rocketsonde is disclosed in U.S. Patent No. 3,094,896 to Ralph C. Carson, Jr. et al., issued on June 25, 1963.

In order to retard the descent of the sensing and transmitting apparatus of the rocketsonde, a parachute is employed which is positively attached to the sensor and transmitter. When nylon or silk material was used for the parachute canopy it was found difficult to make the same radar reflective or to pack the canopy in the small volume available. Additionally, it was found that the porous nature thereof operating in a rarified or low density atmosphere precluded the parachute from becoming operational. Additionally, the low packing density of this type of material precluded the utilization of larger parachutes necessary to compensate for either the low air drag encountered at extremely high altitudes or for heavy payloads. Furthermore, a parachute constructed of nylon or silk is not radar reflective which thereby precludes radar tracking of the sensing and transmitting equipment. Additionally, when plastic or other nonporous material was used as the canopy material it was found also to have non-opening characteristics which precluded the parachute from becoming operational.

The general purpose of this invention is to provide a positive-opening parachute which embraces all of the advantages of similarly employed prior art devices and possesses none of the aforedescribed disadvantages. To attain this, the present invention contemplates a unique nonporous parachute of radar reflective material having associated therewith a unique opening mechanism for insuring opening of the parachute in a minimum of elapsed time irrespective of the air density medium in which the parachute is operating and irrespective of the velocity at which the parachute is ejected.

An object of the present invention is the provision of a lightweight, rugged, nonporous, radar reflective parachute having positive opening characteristics irrespective of air density or other atmospheric conditions.

Another object is to provide an inexpensive, compact, nonporous, radar reflective parachute having positive opening characteristics irrespective of the velocity at which the parachute is ejected.

A further object of the invention is the provision of a simple, reliable, radar reflective parachute possessing high density packing qualities and having positive opening characteristics irrespective of air density or ejection velocity.

Other objects and features of the invention will become apparent to those skilled in the art as the disclosure is made in the following description of an embodiment of the invention as illustrated in the accompanying sheet of drawing in which:

FIG. 1 represents a longitudinal cross sectional view of a rocket head including the propelling motor;

FIG. 2 represents a view of the rocket head of FIG. 1 during the dispensing of the rocket payload occurring along the flight path of the rocket;

FIG. 3 represents an instantaneous and fragmentary view of the rocket payload after the same has been ejected from the rocket at a predetermined point in the trajectory path of the rocket; and FIG. 4 represents a top view of the parachute of the present invention with portions thereof removed for purposes of illustration.

In the illustrated embodiment of the invention, a rocket is indicated generally by a rocket head assembly 10 mechanically coupled to a propelling motor such as a reaction motor 11, shown only by a fragment of its forward portion: the motor 11 has a cylindrical motor casing 14 closed at the fore end by a cylindrical coupling or adapter 16 recessed on its forward side and threadably fixed in the casing 14. A rocket head tube assembly 17, coaxially disposed in tandem with and forward of the motor casing 14, seats against a shoulder 18 in the recessed portion of the coupling 16 thereby imparting a forward thrust to the rocket head assembly 10 from the motor 11 when the latter is activated. Prior to the firing of the rocket from a launcher tube, not shown, a pair of retaining pins, also not shown, placed within apertures 19 maintain a locking connection between the tube 17 and the adapter 16. The structure of the retaining pins and their interaction with the rocket head 10 and a launching tube is adequately described in U.S. Patent 3,095,814 issued to T. W. Jansen et al. on July 2, 1963, and forms no part of the present invention. After the rocket is fired from the launcher tube, the retaining pins are free to slide outwardly and thereby unlock the connection between the tube 17 and the adapter 16. The nose cone assembly 10 thereafter remains seated in the adapter 16 due only to the thrust of the motor 11 against the tube 17 at the shoulder 18.

The tube 17 is streamlined at its fore end by a weighted nose cone 20 which is fixed to the tube 17 by convenient means such as pins or the like. A fin-type stabilizer assembly 21 is slidably mounted about the tube 17 to provide aerodynamic stability to the nose cone assembly while in flight.

The tube 17 houses therein a transmitter housing 25 which in turn has included therein atmospheric condition sensors such as temperature and humidity sensors, not shown, in addition to a transmitter assembly 26, shown in FIG. 3, for transmitting the information obtained by the sensors. The transmitter housing 25 additionally includes therein an antenna 27 and portions of a parachute assembly generally noted at 30, to be more fully described below.

Within the tube 17 and aft of the transmitter housing 25 is a cylindrical container 32 formed of a pair of cylindrical segments 33—33 and operating to envelope a parachute canopy indicated at 35. In the packaged arrangement illustrated in FIG. 1, shroud lines 36 connected to the canopy 35 are coiled about a spool assembly 37 which in turn is stored within the transmitter housing 25.

A timing mechanism generally indicated at 40 is located aft of the parachute container 32 and functions to maintain the aforementioned rocket head payload elements within the tube 17 against the urging of an ejection spring 42 which is interposed between the transmitter housing 25 and the nose cone 20. The timer 40 is similar in structure and operation to that disclosed in U.S. Patent 3,095,814, noted above, and does not form an essential part of the present invention.

Located within the tube assembly 17 at the aft end thereof is a burnout spring 43 which functions to assure positive separation between the rocket head assembly 10 and the propelling motor 11 when the motor propulsion ceases. Upon the separation of the rocket head assembly 10 from the motor 11, the timing mechanism 40 is unblocked thereby initiating the timing interval. The rocket head assembly 10 continues along the flight path until the timing interval terminates, whereupon ejection spring 42 is enabled to eject the payload contained within the tube 17. See FIG. 2. It is contemplated that the timing can be set for any interval to effect the dispensing of the payload. For example, a useful interval for determining the maximum altitude reached by a vertically directed rocket will terminate at its apogee.

Referring now to FIGS. 3 and 4, the parachute assembly 30 is illustrated in the deployed condition with cylindrical segments 33 falling away from the parachute canopy 35 and with shroud lines 36 unwinding from their coiled position about a spool assembly 38. Spool assembly 38 is constructed of plastic or other appropriate material and is constructed of a pair of parallel circular rims 38 interconnected by a cylindrical portion 39. In coiling the shroud lines about the spool, the shroud lines are doubled and the line so formed is looped intermediate the ends thereof and coiled about the spool assembly 37.

The free ends of the shroud line 36 have secured thereto a swivel assembly 45 of the type known and used in the art which in turn has one end thereof secured to a shock absorber assembly 46. Shock absorber assembly 46 comprises a stop cord 47 of nylon or like material interconnected between the swivel assembly 45 and the antenna 27. Tied to the ends of the stop cord 47 is a strip of bungee 49 of a length shorter than that of the cord 47 for providing shock absorption for the sensor and transmitting apparatus. Antenna 27, shown foreshortened in FIG. 3, interconnects the shock absorber assembly 46 at the end of the stop cord 47 to the transmitter assembly 26.

The parachute canopy 35, as illustrated in FIG. 4, is of circular configuration and is constructed of a metallized non-porous, flexible plastic sheet material having lightweight and high strength characteristics, such as aluminized Mylar or other like commercially available material.

In order to assure positive opening of the parachute canopy, a specially wound spring 50 formed of music wire or the like, is attached at the outer edge of the circular canopy 35. The spring member 50 is formed of a single continuous section of wire soldered or otherwise secured at the ends thereof and so constructed as to provide an outer circumferential row of loops 51 and an inner circumferential row of loops 52: the loops 52 are staggered with respect to the loops 51 and each loop of one row is integrally interconnected with the adjacent radially spaced loops of the other row by interconnecting portions 55.

To secure the spring members 50 to the canopy 35 circumferential strips 56 and 57 of a resilient, flexible plastic tape, such as Mylar or the like are applied to the loops 51–52, respectively, and to the parachute canopy 35. Each of three suspension or shroud lines 36 is placed diametrically across the top portion of the circular parachute canopy 35 at intervals of approximately 60 degrees and is secured thereto by a plastic tape 58 of material similar to that of strips 55 and 56. The six shroud lines thus formed are then looped about the spool assembly 37 as discussed above.

As seen in FIG. 4, an aperture 60 is formed at the center of the canopy 35 for providing stability and controlled retardation to the parachute. It is understood that the diameter and location of the aperture 60 may be modified in order to obtain various rates of descent depending upon the pay load, etc. and that although three shroud lines 36 are illustrated, a modification of the number utilized may be made without departing from the spirit and scope of the present invention.

The packaging of the parachute canopy is achieved by folding the same on the dotted lines as shown in FIG. 4 in an accordion pleated arrangement both parallel to the radii and concentric to the center of the parachute thereby forming a cylindrical configuration to be enclosed by cylindrical container 32.

By reason of the above arrangement and upon ejection from the tube 17, the spring member 50 immediately opens the parachute to approximately three fourths of the ultimate inflated size thereby permitting air drag to complete inflation. A parachute is thereby obtained which may be opened independent of ejection velocity and air density and one which is inexpensive and possesses high density packing characteristics.

Obviously, many modifications and variations of the present invention are possible in the light of the above teachings. It is, therefore, to be understood that within the scope of the appended claims, the invention may be practiced otherwise than as specifically described.

What is claimed is:

1. A positive-opening parachute for use in retarding the descent of an object ejected from a receptacle comprising in combination:

an annular canopy formed of an elastic, non-porous, radar-reflective material;

and continuous spring means secured about the periphery of said canopy for automatically opening said canopy when the object and parachute are ejected from the receptacle, said continuous spring means being formed of a thin, elongated wire-like material configured into an annular undulated shape and being secured to said canopy by an elasitc, flexible adhesive.

2. The parachute as defined in claim 1 wherein said continuous spring means includes:

a first annular row of spaced loop-members, a second annular row of spaced loop-members, said second row being spaced inwardly of said first row of loop-members and being in a staggered relation with said loop-members of said first row, and means interposed between and connected to the loop of one row and the adjacent staggered loops of the other row.

3. The parachute as defined in claim 1, and including:

a receptacle for normally containing the parachute in a collapsed condition in order to house the parachute in a small space when inoperative, said receptacle containing an object, the rate of descent of which is to be retarded, cord means connecting said parachute canopy to said object, a locking device normally retaining said parachute canopy and said object within said receptacle, means for releasing said locking device, and means within said receptacle for automatically projecting the parachute and said object therefrom upon release of said locking device.

4. The apparatus as defined in claim 3 wherein said cord means includes:
 a plurality of angularly spaced cord elements disposed diametrically of said parachute canopy,
 said cord elements being secured to the top of said parachute canopy and having the ends thereof secured to said object.

5. The apparatus of claim 4 wherein said diametrically disposed cord elements are secured to said parachute canopy by a flexible and elastic adhesive.

References Cited by the Examiner
UNITED STATES PATENTS

| | | | |
|---|---|---|---|
| 1,138,140 | 5/1915 | Oister | 244—149 X |
| 3,104,612 | 9/1963 | Knacke et al. | 244—145 X |
| 3,141,640 | 7/1964 | Sutliff et al. | 244—138 |

MILTON BUCHLER, *Primary Examiner.*

A. E. CORRIGAN, *Assistant Examiner.*